(12) United States Patent
Skoglund et al.

(10) Patent No.: US 10,137,387 B2
(45) Date of Patent: Nov. 27, 2018

(54) DEAERATION SYSTEM AND METHOD FOR DEAERATION

(71) Applicant: Tetra Laval Holdings & Finance S.A., Pully (CH)

(72) Inventors: Tomas Skoglund, Lund (SE); Fredrik Innings, Torna Hällestad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 155 days.

(21) Appl. No.: 15/025,803

(22) PCT Filed: Sep. 22, 2014

(86) PCT No.: PCT/EP2014/070111
§ 371 (c)(1),
(2) Date: Mar. 29, 2016

(87) PCT Pub. No.: WO2015/044079
PCT Pub. Date: Apr. 2, 2015

(65) Prior Publication Data
US 2016/0243466 A1    Aug. 25, 2016

(30) Foreign Application Priority Data
Sep. 30, 2013 (SE) ..................... 1351133

(51) Int. Cl.
*B01D 19/00* (2006.01)

(52) U.S. Cl.
CPC ..... *B01D 19/0042* (2013.01); *B01D 19/0036* (2013.01)

(58) Field of Classification Search
CPC ............... B01D 19/00–19/0495; E21B 21/067
(Continued)

(56) References Cited

U.S. PATENT DOCUMENTS

| 3,477,208 A | 11/1969 | Keller |
| 4,486,203 A | 12/1984 | Rooker |

(Continued)

FOREIGN PATENT DOCUMENTS

| CN | 201596413 U | 10/2010 |
| WO | WO 2013/037796 A1 | 3/2013 |

OTHER PUBLICATIONS

Table 1. Vapor Pressure of Liquid Water between 15.0° C. and 29.9° C., http://www.cabrillo.edu/~aromero/CHEM_30A/30A_Handouts/Vapor%20Pressure%20of%20Water%20(Activity%2015).pdf (last visited Feb. 26, 2018).*

(Continued)

*Primary Examiner* — T. Bennett McKenzie
(74) *Attorney, Agent, or Firm* — Renner, Otto, Boisselle & Sklar, LLP

(57) ABSTRACT

A system for deaerating a liquid comprises a separation vessel where deaerated liquid is separated from gas, predominantly air; a liquid inlet to the separation vessel through which the liquid enters the separation vessel; a liquid outlet from the separation vessel through which a deaerated liquid exits the separation vessel, and a gas outlet through which the gas exits the separation vessel. The liquid inlet is arranged at a first end of the separation vessel and is configured to give the liquid entering the separation vessel a trajectory, and wherein a stop plate is arranged in the trajectory to abruptly stop the propagation of liquid travelling along the trajectory.

19 Claims, 2 Drawing Sheets

(58) Field of Classification Search
USPC .................................................. 95/241–266
See application file for complete search history.

(56) References Cited

U.S. PATENT DOCUMENTS

| | | | | |
|---|---|---|---|---|
| 6,123,750 | A * | 9/2000 | Espinal | B01D 19/0005 |
| | | | | 261/117 |
| 2004/0050253 | A1* | 3/2004 | Skoglund | A23L 2/76 |
| | | | | 95/266 |
| 2007/0175331 | A1* | 8/2007 | Tomshak | B01D 19/0042 |
| | | | | 96/204 |
| 2009/0084721 | A1 | 4/2009 | Yardimci et al. | |

OTHER PUBLICATIONS

International Search Report (PCT/ISA/210) dated Jan. 28, 2015, by the European Patent Office as the International Searching Authority for International Application No. PCT/EP2014/070111.

Written Opinion (PCT/ISA/237) dated Jan. 28, 2015, by the European Patent Office as the International Searching Authority for International Application No. PCT/EP2014/070111.

\* cited by examiner

DEAERATION SYSTEM AND METHOD FOR DEAERATION

TECHNICAL FIELD

The present invention relates to a system and a method for deaeration of a liquid food product.

BACKGROUND

Within the field of packaging of liquid products deaeration is a well established concept and deaeration is included as an essential step in most processing plants e.g. in plants where liquid product is received as a bulk in a first end of the line and delivered as individual packaging containers in the other end of the line. Air (or oxygen) may be present in the liquid product for different reasons, the two main reasons being that it is dispersed or dissolved. Taking the example of milk, there will be some oxygen in the milk already before it has left the cow, and more oxygen will be mixed and dissolve into the milk at each processing step starting with the milking process itself.

The air and oxygen may result in several negative effects ranging from reduced skimming efficiency in separators, cavitation in the product during processing, fouling of heating surfaces in pasteurizers, shortened product shelf life (due to oxidation), etc., which are some reasons to why deaeration is a well-established processing step.

To simplify the underlying theory, which obviously is well-established and well-known to the skilled person, the solubility of a gas such as oxygen or nitrogen in a liquid will depend of temperature and pressure. At lower temperatures more oxygen or nitrogen may be dissolved in the liquid than what is the case at a higher temperature, i.e. the saturation concentration is higher at a lower temperature. For pressure the relationship is reversed, the higher the pressure the higher the saturation concentration. This simple relationship establishes that in order to deaerate a liquid one or both of the temperature or the pressure may be altered. Also, it may be obvious that deaeration as such is not difficult to accomplish by simply dialing in the desired temperature and pressure of a particular saturation concentration in a vessel containing the liquid. In a commercial production line, however, the deaeration should allow treatment of thousands of liters of liquid product per hour with a requirement of being energy efficient which renders the theoretical approach of awaiting equilibrium to be reached inapplicable.

A deaeration method more commonly used in the main field of the present invention is to make use of a vacuum deaeration in an expansion vessel connected to vacuum. The liquid is transported to the expansion vessel with a certain temperature which is some degrees above the boiling point at the pressure prevailing in the expansion vessel. When the liquid enters the vessel via a valve and the temperature and pressure conditions in the vessel causes it to instantly start boiling, a process referred to as flash boiling (flash or flashing in the following). The process results in that liquid in vaporized and that air is released from dissolved form during flashing. Liquid vapor condense against cooled areas in the vessel, while the released air is evacuated from the vessel by the vacuum pump, while the liquid exits through an opening in the bottom of the vessel. In order to increase the separation rate the liquid may enter the expansion vessel in a tangential direction, so as to induce a swirl.

SUMMARY

To this end the present invention relates to a system for deaerating of a liquid. Preferred embodiments are defined in the dependent claims.

A system for deaerating a liquid may comprise a separation vessel where deaerated liquid is separated from gas, predominantly air; a liquid inlet to the separation vessel through which the liquid enters the separation vessel; a liquid outlet from the separation vessel through which a deaerated liquid exits the separation vessel; and a gas outlet through which the gas exits the separation vessel. The liquid inlet is arranged at a first end of the separation vessel and is configured to give the liquid entering the separation vessel a trajectory, and a stop plate is arranged in the trajectory to abruptly stop the propagation of liquid travelling along the trajectory. A pressure difference upstream or at the inlet may give the liquid such a velocity that a free jet is formed as the liquid enters the separation vessel. More specifically the liquid may have been pressurized to a pressure $P_0$ and depressurized to a pressure $P_1$ prior to entering the separation vessel such as to stimulate a deaeration process and increase the velocity of the liquid entering the separation vessel.

The liquid outlet may be arranged at a second end of the separation vessel. That second end may in one or more embodiments be an end remote to or opposite to the first end where the liquid inlet is arranged.

To make full use of the positioning of the liquid inlet and outlet respective, as well as for other reasons, the separation vessel may have an elongated shape in a horizontal longitudinal direction.

In one or more embodiments the separation vessel may have a flattened cross section in a horizontal cross direction, orthogonal to a horizontal longitudinal direction. An effect of the flattened cross section may be that for a specific volume of liquid in the separation vessel the depth of the liquid may be reduced as compared to e.g. a cylindrical separation vessel (circular cross section). According to one or several related embodiments the separation vessel may have an oval or elliptic cross section in a horizontal cross direction, orthogonal to a horizontal longitudinal direction.

The liquid inlet may be arranged at about 65-80% of a height, more specifically at 70-75% of the height of the separation vessel.

To increase the efficiency of the system it may according to one or more embodiments include a recovery system for deaerated liquid leaving through the gas outlet, wherein said recovery system guides the recovered liquid via a recovery line back to the deaerated liquid, upstream or downstream the liquid outlet. Such system may typically be used when foam formed as a result from the deaeration process follows the gas out of the separation vessel. The foam consists of liquid and gas, and it is desirable to recover the liquid rather than allowing for it to be wasted. In another embodiment there may be arranged a spray nozzle in a line leading from the gas outlet. The spray nozzle may be arranged to spray a liquid in towards the gas outlet, thus extinguishing any foam trying to escape through the gas outlet. The spray may in one or several embodiment by a hollow cone spray.

In one or more embodiment depressurization may realized by a throttling point directly upstream the liquid inlet or a throttling point constituting the liquid inlet, and in related embodiments the pressure drop ($P_0$-$P_1$) may be about 2-3 bar.

The system as such may be configured to maintain a pressure $P_1$ in the separation vessel being above the boiling point of the liquid present in the separation vessel at prevailing liquid temperature.

DESCRIPTION OF EMBODIMENTS

Figure 1:
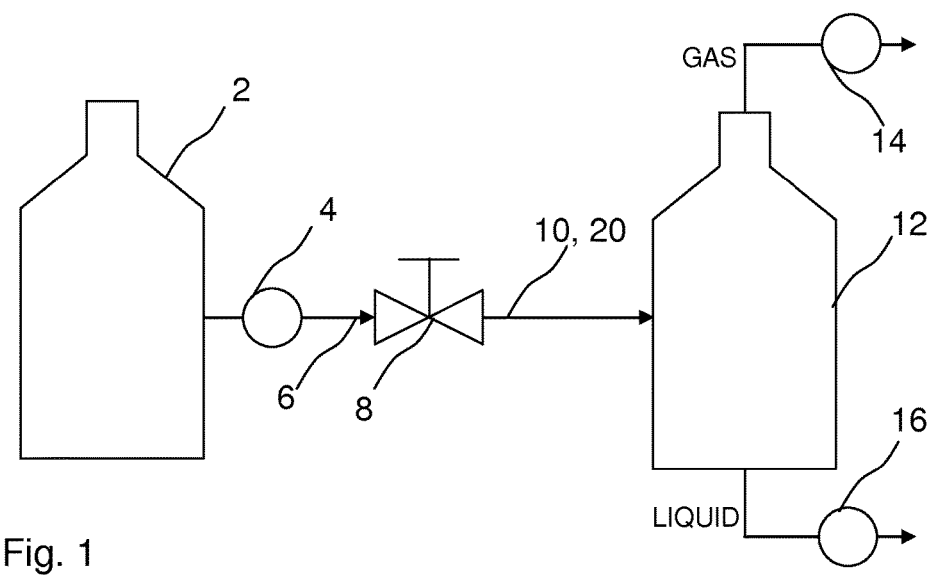
FIG. 1 is a schematic view of a deaerator system according to an embodiment of the present invention.

A standard method for deaeration may involve the accomplishment of a flash boil by subjecting the liquid to a pressure and temperature forcing it to boil. A technique which may be used in embodiment of the present invention is actually to prevent the liquid from flash boiling in that manner. In order to further elucidate that aspect of embodiments of the present invention some more explanation follows. The steps of pressurizing the liquid to a pressure above atmospheric, guiding the pressurized liquid to an upstream end of a nucleation valve, and lowering the pressure on a downstream side of the valve to a subatmospheric pressure, will cause gas bubble nucleation as liquid passes the throttling point (may be referred to as 'nucleation valve' to highlight its function) as the first step of the deaeration. Relying on the gas bubble nucleation as a first step in the deaeration process differs from prior art technique where flashing is the predominant effect utilized and the inventive method provides an energy efficient and time efficient deaeration method.

It may be preferred to form a free fluid jet with the nucleation valve. Experimental results indicate that the formation of a high-velocity jet flow, which in most applications will be a turbulent jet flow, will enhance the deaeration. The free jet flow is preferably not restricted (e.g. directed into a wall). In this context it should be noted that the flow is contained in some sort of piping or similar, and that some part of the formed jet will interact to some degree with the walls of the piping. The core of the jet will however not interact to any significant degree with a constructional delimitation of the system. In embodiment of the present invention the jet may follow its trajectory into a stop plate arranged in the separation vessel. This will prevent the jet from disturbing the conditions in the separation vessel.

In many situations it may be preferred to inducing a pressure drop (a depression) over the nucleation valve. The pressure drop may in one or more embodiments exceed 2 bar, and even exceed 3 bar. It may in other embodiment go up to an extreme of around 4 bar or 5 bar. Experiments indicate that an increased pressure drop results in an increased deaeration efficiency. It is indeed possible to apply higher pressures upstream the valve (in order to increase the pressure drop) yet there are practical constraints, e.g. in terms of pump capacity and overall efficiency.

Also touched upon in the summary section is the step of controlling the pressure downstream the valve, e.g. in the separation vessel such that it remains above or at the saturation pressure of the liquid. This will eliminate the risk of flash boiling on a larger scale, and thus it may reduce energy consumption.

A diffusion reactor may be arranged after the nucleation valve. In the diffusion reactor, into which the free jet is directed, dissolved gas in the liquid will diffuse from the liquid into the gas bubbles. In the illustrated embodiment of the present invention, however, the jet is directed directly into the separation vessel. Still, not removing the possibility of having the diffusion reactor debouching directly into the separation vessel, in which gas phase is separated from liquid phase.

It is believed that the sudden pressure drop as such may be an important feature, yet it also seem beneficial to, in one or more embodiments of the present invention, control the pressure on the downstream side of the valve such that it is lower than 0.1 bar. This pressure $P_1$ will vary with several conditions, such as temperature. In more general terms the pressure immediately after the valve may remain below 160% of the saturation pressure for the liquid at the particular temperature, which may be true several embodiments of the present invention.

In one or more embodiments the pressure on the downstream side of the valve is controlled such that the static pressure is above the saturation pressure, while the lowest dynamic pressure as the liquid passes the valve is below the saturation pressure. As the liquid passes the valve it will be accelerated to a high-velocity flow, resulting in local pressure reduction of the dynamic pressure. If the ambient static pressure is close to (above or at) the saturation pressure, the dynamic pressure may drop below the saturation pressure. This will cause local flash boiling, which is believed to facilitate deaeration further.

The system should suggestively include a pump for increasing the pressure in the liquid on an upstream end of a nucleation valve, a vacuum pump for reducing the pressure on a downstream end of the pressure reducing valve and a control system for controlling the pumps.

Some portions of a system for processing a liquid will be described referring to FIG. 1, showing a very principle layout. The present invention may form part of such a system, though individual components may be replaced without departing from the scope of the invention as defined by the claims.

Starting at an upstream position, the system comprises a tank 2 or other system for holding or delivering the liquid to be processed. The system also comprises a pump 4 for increasing the pressure in the liquid, subjecting it to an elevated static pressure $P_{UPSTREAM}$ such that it is forced downstream. The pump 4 may in one or more embodiments be a centrifugal pump, yet other alternatives may be feasible. Piping 6 guides the liquid to the first processing step, namely to the nucleation valve 8. Before describing details of the valve, some words about the arrangement downstream the valve should be mentioned. The piping 10 guiding the liquid following the nucleation valve 8 debouches in a separation vessel 12. In the present embodiment the separation vessel 12 comprises an expansion vessel, connected to a vacuum pump 14 in an upper end, and connected to an evacuation system 16 for liquid in a lower end. Air and other gases resulting from the deaeration will be evacuated via the upper end, while deaerated liquid will be pumped out via the lower end of the vessel. To avoid evacuation of vaporized liquid the upper end of the vessel may comprise a condenser, condensing the vaporized liquid such that it may leave via the lower end instead. The vacuum pump 14 generates a lowered static pressure pressure $P_{DOWNSTREAM}$ propagating to the downstream end of the nucleation valve 8.

Returning to the nucleation valve 8, the increased static pressure upstream the valve will push the liquid towards the nucleation valve 8 and the lowered static pressure downstream the valve will pull the liquid, the relevant term to consider being the pressure drop over the valve 8, which may be defined as $\Delta P = P_0 - P_1$.

In the present embodiment $P_1$ preferably corresponds to a pressure above the vapor pressure at the residing temperature and for the fluid being processed, such to avoid flashing, partly since the generation of flash is energy consuming. To this end it should be mentioned that as the liquid passes the constriction of the valve it will accelerate to a significant velocity, which may cause the dynamic pressure to momentarily drop below the vapor pressure.

Figure 2:
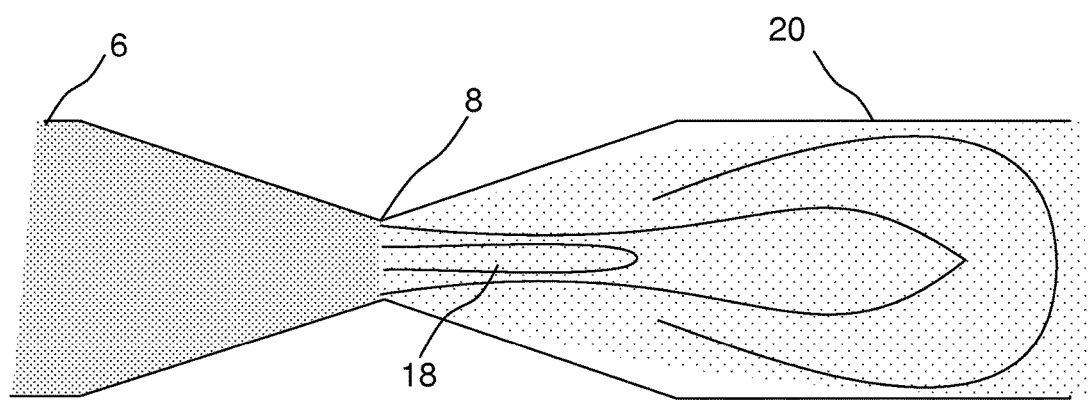
FIG. 2 is a detail view of a portion of the deaerator system according to the first embodiment.

The rapid pressure drop "shocks" the liquid such that a homogenous nucleation occurs, which is beneficial for deaeration. It has been confirmed in experiments that the momentary flash or cavitation in the valve 8 is beneficial from a deaeration perspective. Immediately after being homogenously nucleated the liquid enters the low pressure region downstream the valve in the form of a jet 18, which rapidly breaks up such that the liquid exposes a large surface area forming the interface between gas and liquid. Conditions beneficial for deaeration thus prevail downstream the valve. This is schematically illustrated in FIG. 2

The valve layout, e.g. in terms of exact shape of its nozzle orifice(s) is not crucial, yet some parameters seem to be valuable from an optimization standpont, and two are worth mentioning in particular: 1) The pressure drop should occur rapidly, basically instantly as the liquid passes the valve 8. This indicates that the valve construction should be non-complex, without any intricate tubing following or preceding the nozzle orifice. 2) After the pressure drop the resulting jet should be non-constraint, i.e. a free jet should be allowed to form and break up. This also indicates that a non-complex valve construction without intricate tubing following the orifice is advantageous. In one embodiment the valve may be of a type having a conical regulating plug with a lip seal. This is a standard type of valve and examples include the SPC-2 valve (Alfa Laval), which is a sanitary electro-pneumatic regulating valve for use in stainless steel pipe systems. A simple hour-glass shaped restriction will also due, at least during constant operating conditions, yet a controllable valve is preferred.

For the above reasons, a diffusion reactor 20 is arranged downstream the valve 8, as part of the piping 10. The diffusion reactor 20 will enable turbulent diffusion of the dissolved gas in the liquid phase to the now existing and growing nuclei/gas bubbles, and it should have a construction not entailing a large pressure drop. In the embodiment of FIG. 2 the diffusion reactor 20 comprises a rectilinear pipe, having a diameter such that it does not interact with the formation of the previously mentioned jet 18. Sooner or later as the jet 16 breaks up the flow will diverge and interact with the walls of the diffusion reactor, and even a non-breaking jet would sooner or later impact on the lower wall due to gravity. The flow will continue towards the separation vessel 12, pulled by the vacuum, where it will be separated into a liquid flow and a gas flow. At some point the jet will fill the whole diameter of the diffusion reactor 20, the exact location depending on pressure, temperature, flow velocity, etc. In other embodiment the diffusion reactor is removed and the jet is directed straight into a separation vessel.

In the present embodiment the diffusion reactor 20 is arranged in a horizontal direction. In a second embodiment the diffusion reactor may be arranged in a vertical direction, with the jet coming from above. With this arrangement the pressure loss generated by the diffusion reactor will be compensated by the effect of gravity, reducing the losses in the system. The diffusion reactor may be mounted in any inclination between vertical and horizontal without departing from the scope of the present invention, as defined by the claims.

In the text below some operating parameters for embodiments of the present invention are listed, which may facilitate enablement for a skilled person. The amount (or rate) of liquid being processed may be in the order of up to about 100'000 l/h, though smaller flows are possible, and in experiments conducted flows in the order of 6'000 l/h have been used. These rates are common within the field of the invention, and details in regard of pumps and such on the downstream side of the valve 8 will not be discussed in detail.

The pressure drop over the valve $\Delta P$ preferably exceeds 2 bar, and it is even more preferred that it exceeds 3 bar, and it may be as high as 4 bar or 5 bar. There is no technical problem in increasing $\Delta P$ even further yet the pump used to elevate the pressure will be increasingly expensive.

The temperature downstream the valve should preferably be lower than the flash temperature (the boiling point at the prevailing pressure $P_1$), such as $-10°$ C. below flash or $-5°$ C. or between those temperatures and the flash temperature. Temperatures closer to flash have been found to increase the deaeration efficiency. Flash boiling will still have a beneficial impact on the deaeration, yet experiments verify that it is not as dramatic as for prior art systems.

The length of the diffusion reactor, if used, may be about 100-200 cm, yet it may be even longer. A longer diffusion reactor will improve the deaeration efficiency, yet it may also increase pump losses, which is an unwanted feature. The diameter of the diffusion reactor may be about 5 cm (2" pipe) and it may be manufactured from stainless steel. In theory the diameter of the diffusion reactor would benefit from being larger, since it would result in lower pressure loss, yet due to parameters related to working at pressures close to vacuum may result in a tradeoff where the suggested diameter is beneficial. Smaller diameters may result in reduced deaeration efficiency, supposedly due to a shorter hold up time and an increased interaction between the jet (or spray) and the walls of the diffusion reactor, and due to increased pressure losses, e.g. making the pressure drop less abrupt.

There is no abrupt pressure drop as the liquid passes from the diffusion reactor 20 into the separation vessel 12, in which the separation process initiated in the nucleation valve 8 is finalized. The separation vessel 12 may therefore be of quite rudimentary design as compared to prior art systems where flashing takes place in the expansion vessel. Further, since flash boiling is avoided to a large extent, the amount of vapor is reduced, resulting in that less energy has to be spent on condensing the vapor.

All components of the system being in contact with the product should be made from food grade material or approved for use when processing foodstuff.

The pressure in the liquid upstream the nucleation valve, as well as the flow through the nucleation valve may be controlled by the nucleation valve 8 and the pump 4, i.e. a frequency regulated pump, and for these purposes the pump 4 may also comprise a control valve (not shown).

If the temperature of the liquid upstream the nucleation valve 8 is controlled, this may be effected by means of a heat exchanger.

The pressure downstream the nucleation valve 4 is controlled by pressure regulation of the separation vessel 12.

The temperature of the liquid downstream the nucleation valve 4 is normally not controlled in situations where no flash boiling occurs. The pressure in the separation vessel 12 may be used to control the temperature, if so desired.

Figure 3:
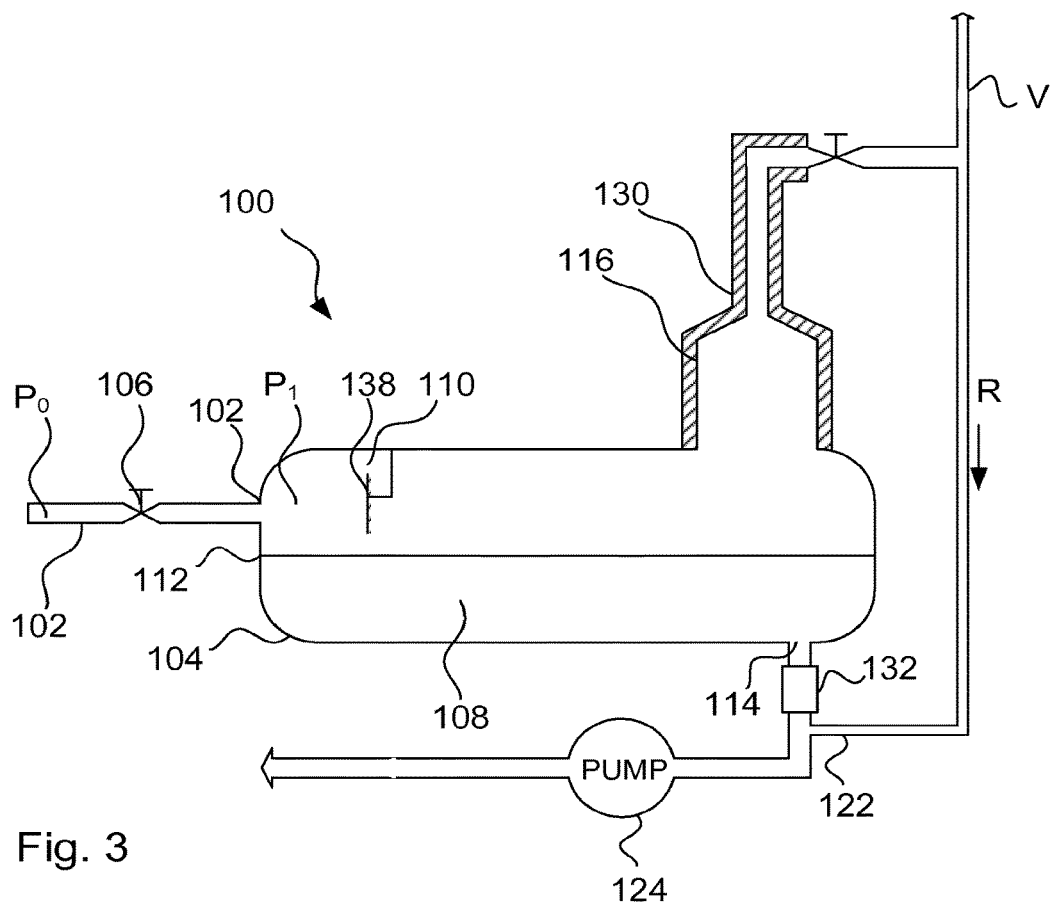
FIG. 3 is a schematic layout of an embodiment of the present invention.

In FIG. 3 there is shown a general layout of a device 100 involving an embodiment of the present invention. Several of the components shown in FIG. 3 are optional, so it actually corresponds to a number of embodiments. Starting from the upstream position the product to be deaerated is fed through a feed line 102, shown to the left in the drawing. The pressure $P_0$ may generally be elevated in the feed line 102, compared to atmospheric in general and compared to a first pressure $P_1$ inside the separation vessel 104 in particular. In fact, the first pressure $P_1$ inside the separation vessel 104 very low typically residing in an area of 0-10° C. above the boiling point (again meaning that if the temperature of the liquid in the separation vessel increased by 0-10° C. the liquid would start to boil). Preferably the pressure $P_1$ may be 0-5° C. above the boiling point, or the lower part of the interval may even vary between 0.1-1° C. above the boiling point to ensure that no boiling occurs. A nucleation valve 106 or, using a more general expression, an expansion valve 106 separates the feed line 102 from the separation vessel 104, and as the product passes the expansion valve 106 it will experience a sudden pressure drop from $P_0$ to $P_1$, inducing a flash boil or to the generation of gas bubbles, thus causing an abrupt start of deaeration. As the product enters the separation vessel the partly deaerated product 108 will collect at the bottom of the separation vessel 104 while the released gases 110 will reside in the remaining part of the vessel 104. An interface surface is depicted by a delimiter line 112. The deaerated product 108 will be pumped out through an exit 114 at the bottom of the vessel 104 and the gases will be evacuated through an arrangement 116 in the top of the separation vessel. The arrangement 116 may suggestively be driven by a vacuum pump (not shown) arranged downstream. The arrangement 116 may in the present embodiment merely comprising a pipe extending from the separation vessel 104.

A side effect of the quite violent deaeration process is that considerable amounts of foam may be generated, a side effect that is unwanted for several reasons, as previously mentioned in the background section. Extinguishing of the foam may merely imply that the foam is separated from the rest of the product flow, yet in most cases it is desired to extinguish the foam such as to capture the product bound thereto. If foam leaves the separation vessel through the arrangement 116, the gases and bubbles enter a foam extinguisher (not shown). This foam extinguisher bursts the bubbles and separates the gas from the product, according to any method known in the art. It is preferred that the arrangement 116 is provided with thermal insulation 130 such that the temperature of the foam does not drop. The gas continues towards the vacuum pump, the path indicated with V, while the product follows the path R, a return line 122 bringing it back to a position downstream the exit 114 from the separation vessel 104. The return line 122 may debouch downstream the exit 114 yet upstream a pump 124 used to pump the deaerated liquid onward in the process. A vortex breaker 132 may be arranged downstream the exit 114 to prevent any vortex from being generated inside the separation vessel 104. A simple design for a vortex breaker is a pipe segment having a pair of baffle plates in a cross arrangement in the longitudinal direction thus creating four longitudinal compartments. There are other more or less elaborate designs for vortex generators which could be used.

In another embodiment the return line 122 comprises either of a return valve or, a pump (such as a liquid ring pump), ensuring that the liquid level in the return line 122 is controlled. Another alternative, which may be used in combination with the other ones or as a solitary solution is to use an ejector to entrain the liquid from the return line 122 in a downstream direction. The liquid used to feed the ejector may be collected downstream the pump 124 and in applications where the pressure downstream the pump 124 is sufficient no further feed means are necessary. In other embodiments the need of a regulation valve or a feed pump may be called for to provide an adequate feed to the ejector 134.

Turning back to features more directly connected to the present invention a stop plate 138 is arranged in the separation vessel 104. In the embodiment of FIG. 3 the stop plate 138 is schematically suspended from the upper portion of the separation vessel 104, yet it may instead or also be suspended in other manner, such as from the side walls or the bottom portion, or combinations thereof. The stop plate 138 may cover a smaller portion of the space above the liquid surface, or a larger portion thereof. In any case the stop plate 138 is arranged in the projected trajectory of the jet of fluid being injected into the separation vessel 104. A typical distance for the stop plate may be about 20-30 cm from the inlet, and the size of the stop plate will obviously vary with distance from the inlet and the shape of the jet. In another embodiment the outlet 114 is arrange close to the end remote to the end in which the inlet is arranged. In this way the length of separation vessel available for separation is maximized. The liquid outlet is arranged in the bottom of the separation vessel, and in that embodiment of the invention the outlet is arranged as remote to the liquid inlet while still being at a lowest level on the bottom of the separation vessel.

Figure 4:
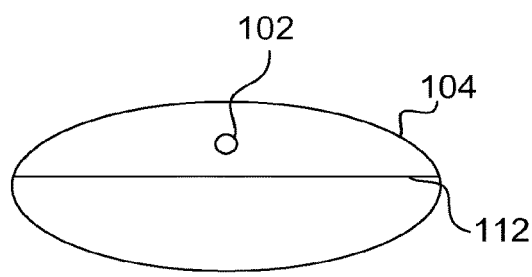
FIG. 4 is a sectional view of an second embodiment of the present invention.

In FIG. 4 a sectional view of a separation vessel is shown. The sectional view illustrates an elliptic cross sectional shape of the separation vessel. The elliptic shape is one example of a flattened cross sectional shape that may be used according to one embodiment of the present invention. In a general meaning the term "flattened" refers to that, looking at the cross section, the width is larger than the height. The separation vessel may thus have other shapes than elliptic without departing from the definition, yet elliptic or rectangular with curved corners or another shape which may withstand forces generated by the pressure difference between the atmospheric pressure outside the separation vessel and the low pressure $P_1$ inside the separation vessel. The inlet 102 is arranged at about 75% of the height of the separation vessel to ensure that there is no detrimental interference between the injected liquid and the liquid already present in the separation vessel. Examples of detrimental interference could be aeration of the liquid or excessive generation of foam.

For obvious reasons there are similarities between the present invention according to any of its embodiments and the prior art, at least in terms of the result to be achieved. However, a fundamental difference is that while the background art focuses on affecting the conditions at some location after the valve, most commonly the pressure and temperature in the expansion vessel, the present invention by one or more embodiments starts by focusing on affecting how the fluid transitions from the conditions upstream the valve to the conditions downstream the valve, and on processing of the liquid prior to it reaching the separation vessel. Some parameters to adjust are the pressure upstream the valve and the pressure downstream the valve. In this way the pressure drop over the valve may be controlled. The dimensions of the restriction in the valve will in turn affect the flow velocity through the valve and thus the transition time. Subjecting the fluid to an instantaneous and significant pressure drop will induce nucleation. Experiments reveal that the nucleation of (gas) bubbles occurs in the entire volume of the fluid, i.e. a homogenous nucleation, and that it therefore facilitates an efficient deaeration. For one or more embodiments of the present invention it is preferred that even if the equilibrium pressure and temperature downstream the valve are such that the fluid does not flash, the minimum pressure caused by the restriction still will induce cavitations in the fluid, which also will facilitates deaeration.

The invention claimed is:

1. A method for deaerating a liquid, comprising the steps of:
   pressurizing the liquid to a pressure $P_0$,
   depressurizing the liquid to a pressure $P_1$, above the boiling point of the liquid,
   injecting the liquid through a liquid inlet into a separation vessel along a trajectory, such that the liquid impacts a stop plate arranged in the separation vessel,
   guiding the liquid from the liquid inlet arranged in a first end of the separation vessel towards a liquid outlet arranged in a second end of the separation vessel, the second end being in an opposed end of the separation vessel as compared to the inlet,
   subjecting the liquid to the pressure $P_1$ while the liquid is in the separation vessel, such that the liquid is prevented from boiling, and
   by using a recovery system:
      deaerating liquid leaving through a gas outlet arranged in the separation vessel to recover liquid from the gas outlet, and
      guiding the recovered liquid via a recovery line back to the deaerated liquid, upstream or downstream the liquid outlet,
   wherein the pressure drop, $P_0$-$P_1$, is in the range of 2 to 5 bar.

2. The method of claim 1, wherein the separation vessel has an elongated shape in a horizontal longitudinal direction.

3. The method of claim 1, wherein the separation vessel has a flattened cross section in a horizontal cross direction, orthogonal to a horizontal longitudinal direction.

4. The method of claim 1, wherein the separation vessel has an oval or elliptic cross section in a horizontal cross direction, orthogonal to a horizontal longitudinal direction.

5. The method of claim 1, wherein the liquid inlet is arranged at 65-80% of a height of the separation vessel.

6. The method of claim 1, wherein the depressurizing is realized by a throttling point directly upstream the liquid inlet or a throttling point constituting the liquid inlet.

7. The method of claim 2, wherein the liquid inlet is arranged at 65-80% of a height of the separation vessel.

8. The method of claim 2, further comprising, by using a recovery system,
   deaerating liquid leaving through a gas outlet arranged in the separation vessel to recover liquid from the gas outlet, and
   guiding the recovered liquid via a recovery line back to the deaerated liquid, upstream or downstream the liquid outlet.

9. The method of claim 2, wherein the depressurizing is realized by a throttling point directly upstream the liquid inlet or a throttling point constituting the liquid inlet.

10. The method of claim 3, wherein the liquid inlet is arranged at about 65-80% of a height of the separation vessel.

11. The method of claim 3, further comprising, by using a recovery system,
    deaerating liquid leaving through a gas outlet arranged in the separation vessel to recover liquid from the gas outlet, and
    guiding the recovered liquid via a recovery line back to the deaerated liquid, upstream or downstream the liquid outlet.

12. The method of claim 3, wherein the depressurizing is realized by a throttling point directly upstream the liquid inlet or a throttling point constituting the liquid inlet.

13. The method of claim 4, wherein the liquid inlet is arranged at 65-80% of a height of the separation vessel.

14. The method of claim 4, further comprising, by using a recovery system,
    deaerating liquid leaving through a gas outlet arranged in the separation vessel to recover liquid from the gas outlet, and
    guiding the recovered liquid via a recovery line back to the deaerated liquid, upstream or downstream the liquid outlet.

15. The method of claim 4, wherein the depressurizing is realized by a throttling point directly upstream the liquid inlet or a throttling point constituting the liquid inlet.

16. The method of claim 5, wherein the liquid inlet is arranged at 70-75% of a height of the separation vessel.

17. The method of claim 7, wherein the liquid inlet is arranged at 70-75% of a height of the separation vessel.

18. The method of claim 10, wherein the liquid inlet is arranged at 70-75% of a height of the separation vessel.

19. The method of claim 13, wherein the liquid inlet is arranged at 70-75% of a height of the separation vessel.

* * * * *